(12) United States Patent
Thangirala et al.

(10) Patent No.: US 8,350,440 B2
(45) Date of Patent: Jan. 8, 2013

(54) INTEGRATED STATOR FLANGE ASSEMBLY FOR DYNAMOELECTRIC MACHINE

(75) Inventors: Subrahmanyam Thangirala, Schenectady, NY (US); Norman John Suguitan, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 181 days.

(21) Appl. No.: 12/760,257

(22) Filed: Apr. 14, 2010

(65) Prior Publication Data

US 2011/0254403 A1  Oct. 20, 2011

(51) Int. Cl.
*H02K 1/06* (2006.01)
*H02K 5/10* (2006.01)

(52) U.S. Cl. ............ 310/216.108; 310/85; 310/216.106; 310/216.113

(58) Field of Classification Search .............. 310/85, 310/106, 108, 113, 216.106, 216.108, 216.113
See application file for complete search history.

(56) References Cited

U.S. PATENT DOCUMENTS

| | | | |
|---|---|---|---|
| 3,114,063 A * | 12/1963 | Karsten ...................... | 310/256 |
| 4,385,251 A | 5/1983 | Mallick et al. | |
| 4,572,751 A * | 2/1986 | Oguri et al. ................ | 148/321 |
| 6,386,546 B1 | 5/2002 | Fedorovich | |
| 6,681,838 B2 * | 1/2004 | Cui et al. ..................... | 164/461 |
| 2006/0131981 A1 * | 6/2006 | Bray et al. .................. | 310/216 |
| 2009/0140526 A1 * | 6/2009 | Jansen et al. ................ | 290/55 |
| 2009/0195115 A1 | 8/2009 | Thangirala | |

* cited by examiner

*Primary Examiner* — Tran N. Nguyen
*Assistant Examiner* — Jose Gonzalez Quinones
(74) *Attorney, Agent, or Firm* — Hoffman Warnick LLC; Ernest G. Cusick

(57) ABSTRACT

An integrated stator flange assembly is disclosed. In one embodiment, the integrated stator flange assembly may have an outer surface and include: a stator flange; and a flux shield bonded directly to the stator flange, the flux shield forming a portion of the outer surface of the integrated stator flange assembly.

19 Claims, 4 Drawing Sheets

INTEGRATED STATOR FLANGE ASSEMBLY FOR DYNAMOELECTRIC MACHINE

BACKGROUND OF THE INVENTION

The subject matter disclosed herein relates generally to dynamoelectric machines and a stator flange for dynamoelectric machines. More specifically, the subject matter disclosed herein relates to an integrated stator flange assembly including a preformed flux shield which is inserted into a mould into which the stator flange is cast. The resulting integrated stator flange assembly may provide for increased strength, magnetic permeability, and improved thermal conductivity and electrical resistivity.

Flux shields have been used in dynamoelectric machines (e.g., electric generators) to divert stray flux away from the stator core clamping flange and the stator core end laminations. These shields are traditionally formed of a conductive material, which enables a current to be circulated through the shield, thereby repelling stray flux from the shielded members. Current flux shields are formed separately from the members that they shield, and attached to the dynamoelectric machine after formation.

BRIEF DESCRIPTION OF THE INVENTION

An integrated stator flange assembly for a dynamoelectric machine is disclosed. In one embodiment, the dynamoelectric machine includes: a rotor; a stator electromagnetically coupled to the rotor; a stator end winding coupled to the stator; and an integrated stator flange assembly coupled to the stator, the integrated stator flange assembly having an outer surface and including: a stator flange; and a flux shield bonded directly to the stator flange, the flux shield forming a portion of the outer surface of the integrated stator flange assembly.

A first aspect of the invention provides a dynamoelectric machine comprising: a rotor; a stator electromagnetically coupled to the rotor; a stator end winding coupled to the stator; and an integrated stator flange assembly coupled to the stator, the integrated stator flange assembly having an outer surface and including: a stator flange; and a flux shield bonded directly to the stator flange, the flux shield forming a portion of the outer surface of the integrated stator flange assembly.

A second aspect of the invention provides an integrated stator flange assembly having an outer surface and including: a stator flange; and a flux shield bonded directly to the stator flange, the flux shield forming a portion of the outer surface of the integrated stator flange assembly.

BRIEF DESCRIPTION OF THE DRAWINGS

These and other features of the disclosure will be more readily understood from the following detailed description of the various aspects of the invention taken in conjunction with the accompanying drawings that depict various aspects of the invention, in which.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide for improved strength, magnetic permeability, thermal conductivity and electrical resistivity of an integrated stator flange assembly in a dynamoelectric machine. In dynamoelectric machines, particularly high-powered generators, flux shields are necessary in order to prevent overheating of essential working components of the machine. While previous techniques of forming dynamoelectric machines without flux shields have been used, these techniques are not effective in high-powered generators (e.g., 150 Megawatts and up) because of the strong leakage flux in the core end region created by high currents flowing in the armature end windings of those machines. Although necessary to these high-powered generators, flux shields require separate fabrication and attachment, and can cause additional manufacturing and assembly process steps, mechanical stability concerns, as well as increased costs.

In one embodiment, the invention includes a pre-formed flux shield bonded directly to the stator flange. In this case, the pre-formed flux shield may be inserted into a mould into which the stator flange is later cast. This process may create an integrated stator flange assembly as described herein. This integrated stator flange may be a unitary structure, that is, one without substantial space between the flux shield and the stator flange. One feature of the integrated stator flange assembly is that it minimizes eddy current losses that occur in the cast portion of the stator flange. These eddy currents may be induced by leakage magnetic flux emanating from the stator end windings. Additionally, the integrated stator flange assembly may cause the eddy currents to flow predominantly in the flux shield portion of the integrated stator flange. The flux shield portion may have inherently higher thermal conductivity than the stator flange portion, and may therefore be more effective at dissipating heat energy to the surrounding cooling gas. This may reduce the risk of overheating the stator flange. Moreover, the integrated stator flange assembly allows for a streamlined manufacturing process as the stator flange and flux shield can be cast as one integrated member. As a result, the integrated stator flange assembly reduces the need for mechanical fasteners and improves assembly by combining the stator flange and flux shield into a single continuous member. Furthermore, by casting the stator flange and flux shield together, the total amount of material (e.g., copper) used may be reduced by as much as sixty percent.

Figure 1:
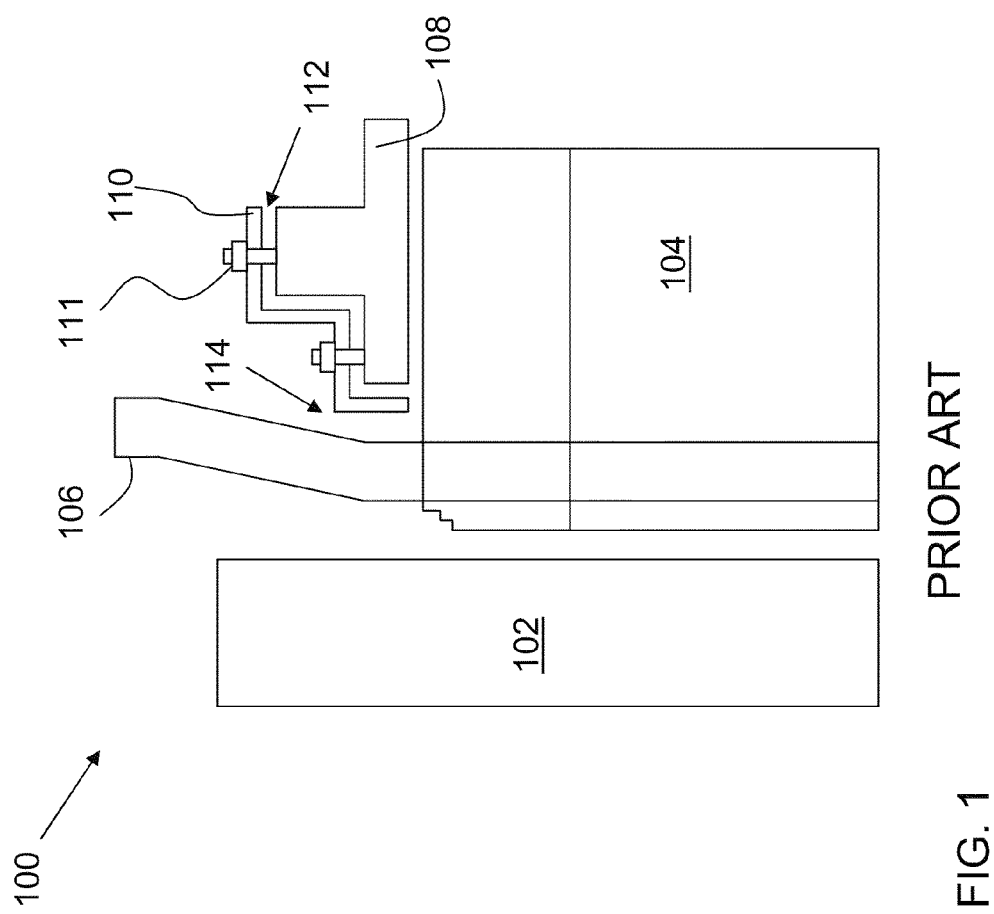
FIG. 1 shows a cross-sectional schematic view of a stator flange and flux shield according to the prior art

Turning to the drawings, FIG. 1 shows a cross-sectional view of a relevant portion of a dynamoelectric machine (e.g., an electric generator) 100 according to the prior art. Dynamoelectric machine 100 may include a rotor 102 and a stator 104. Rotor 102 may be a non-stationary component of dynamoelectric machine 100 and stator 104 may be a stationary component of generator 100. Stator 104 and rotor 102 may be electromagnetically coupled, and during operation, may be used, e.g., to generate electricity as is known in the art. Operation of dynamoelectric machine 100 has been omitted for clarity, but it is understood that dynamoelectric machine 100 may operate as any conventional dynamoelectric machine.

Generator 100 may also include a stator end winding 106 that is coupled to stator 104. As shown, stator 104 further includes a stator flange 108 coupled to stator 104, the details of which are omitted for clarity. Stator flange 108 has a flux shield 110 attached thereto via fasteners 111. Fasteners 111 may be conventional mechanical fasteners (e.g., bolts, screws, spacers, etc.) capable of holding flux shield 110 at a distance (space 112) from stator flange 108. In some applications the flux shield is bolted to the flange with insignificant space there between. As shown in FIG. 1, a second space 114 exists between flux shield 110 and end winding 106. This space may aid in preventing damage to stator end winding 106. Specifically, this space 114 may aid in preventing high localized dielectric stress between the stator winding and the stator flux shield. Further, second space 114 may reduce erosion occurring on stator end winding 106 from its movement during operation. Moreover, second space 114 may aid in reducing abrasion of insulation of stator end winding 106 (not shown).

Figure 2:
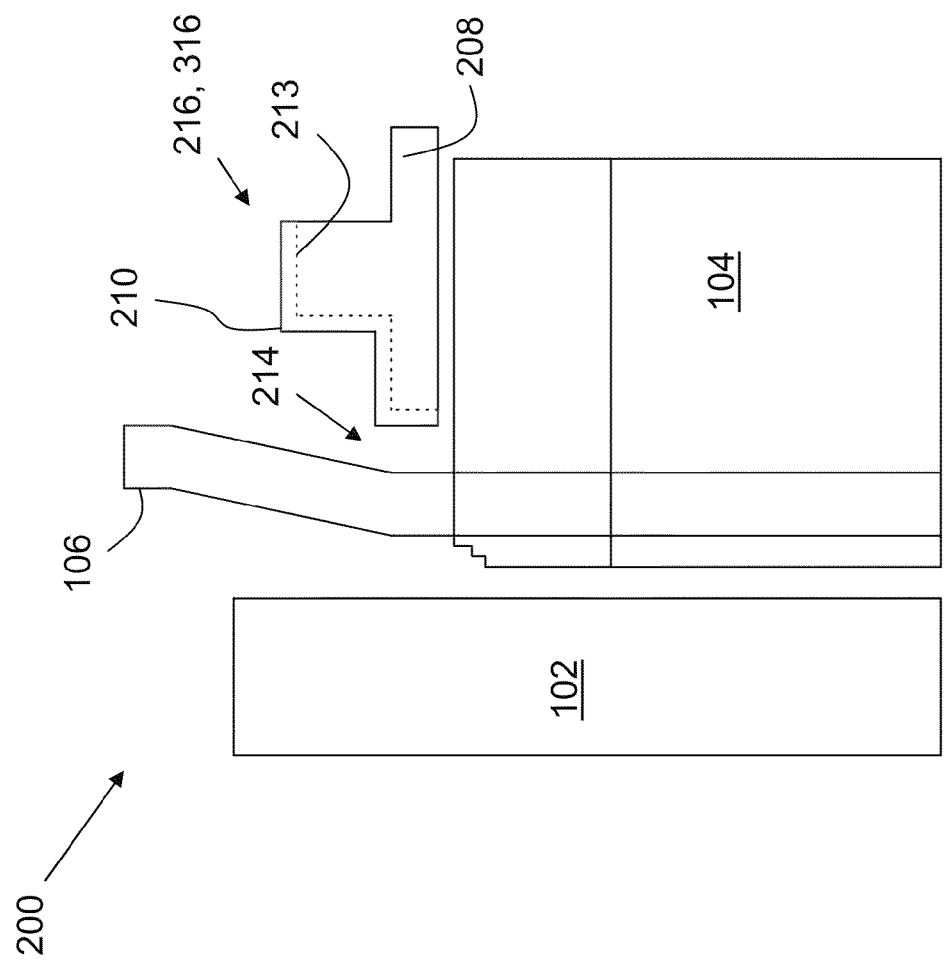
FIG. 2 shows a cross-sectional schematic view of an integrated stator flange assembly according to an embodiment of the invention.

Turning to FIG. 2, a schematic cross-sectional view of a dynamoelectric machine 200 according to an embodiment of the invention is shown. Dynamoelectric machine 200 may be substantially similar to dynamoelectric machine 100 of FIG. 1 (e.g., including rotor 102, stator, 104, etc.), however, dynamoelectric machine 200 may include an integrated stator flange assembly 216 according to an embodiment of the invention. Integrated stator flange assembly 216 may be coupled to stator 104 (similarly to stator flange 108 of FIG. 1), and may include a stator flange 208 and a flux shield 210 (e.g., a pre-formed copper flux shield) to which the stator flange 208 is cast, creating a continuous member. Stator flange 208 and flux shield 210 may be joined at one or more junctions 213 at the casting stage such that the composition of the junction 213 is substantially similar to the composition of the flux shield 210 and/or the stator flange 208. That is, integrated stator flange assembly 216 may be formed of a bi-metallic structure with junction 213 between the two materials that may include portions of both materials. It is understood that the integrated stator flange assembly 216 which is shown and described herein may be applied to stator flanges of varying shapes and in dynamoelectric machines of varying sizes. That is, the integrated stator flange assembly 216 (and 316) may be applied to e.g., flat or duck-bill shaped stator flanges.

Figure 3:
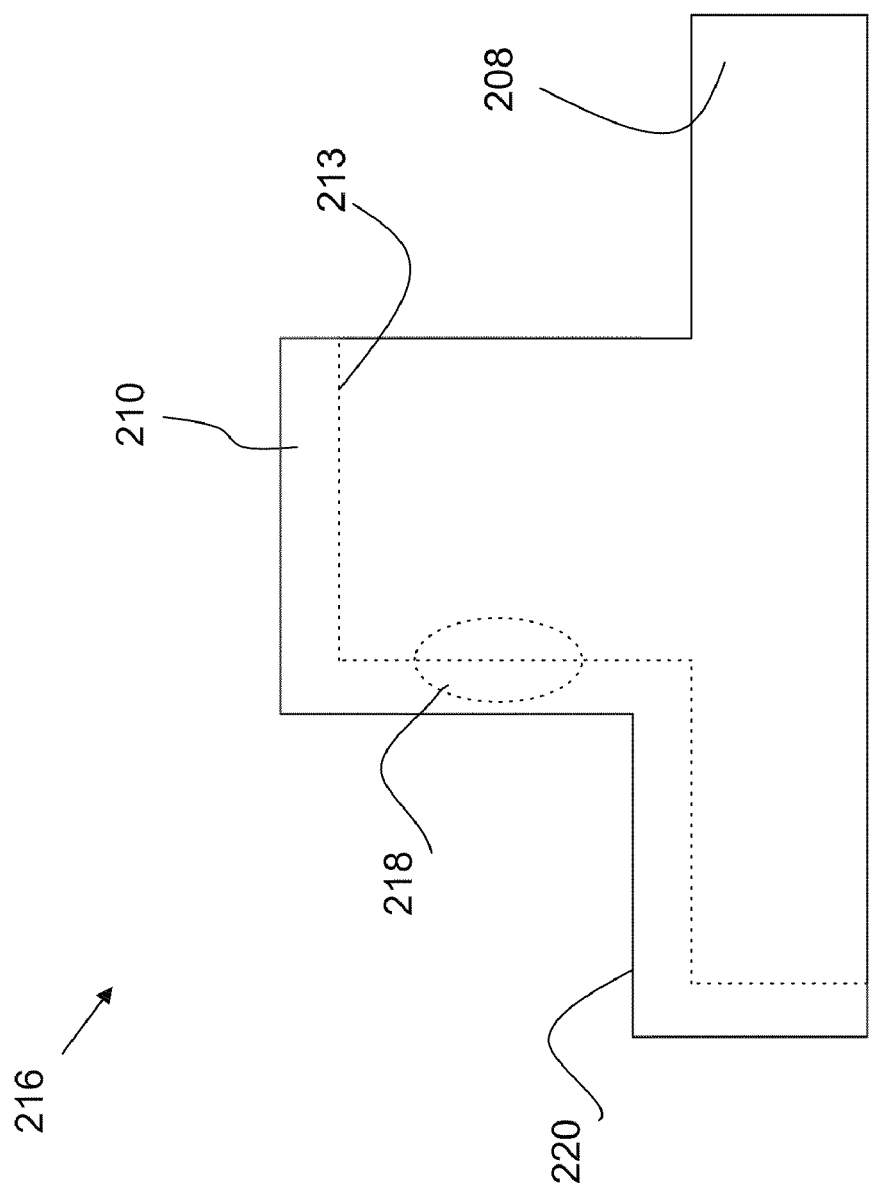
FIG. 3 shows a close-up schematic side view of an integrated stator flange assembly according to an embodiment of the invention.

Turning to FIG. 3, a close-up view of an integrated stator flange assembly 216 according to an embodiment of the invention is shown. As shown, junction 213 referred to with respect to FIG. 2, may include a fusion zone/diffusion region 218 whereby at least one of the compositions (e.g., stator flange material and/or flux shield material) diffuses into the other. For example, in one embodiment, integrated stator flange assembly 216 may include two distinct homogeneous materials. In this case, stator flange 208 includes a ductile iron casting and flux shield 210 includes a pre-formed copper insert. Here, the fusion zone/diffusion region 218 may comprise a mixture of copper and iron, whereby the copper at the diffusion region 218 diffuses into the iron. This diffusion region may enhance the overall mechanical stability of integrated stator flange assembly 216 while maintaining the performance-related advantages of the integrated stator flange assembly 216.

In one embodiment, the integrated stator flange assembly 216 may be cast, e.g., at a foundry. This casting may include one or more of the following processes: a) Cleaning a portion of the pre-formed flux shield 210 insert to substantially remove oil, moisture and corrosion products (e.g., oxides) from at least the inner surface of the flux shield 210 being cast to the stator flange 208. Particularly, this process may include cleaning a surface of flux shield 210 which may be exposed to liquid metal contact during casting; b) After cleaning of the surface to be cast, increasing the contact surface area of the surface to be cast by, e.g., roughening the inner surface with machining grooves and/or surface projections to allow for mechanical inter-locking with stator flange 208 during casting. Increasing the contact surface area may allow for improved liquid metal fusion at fusion zone/diffusion region 218 and improved surface bonding during mould filling; c) In an optional process, the inner surface of flux shield 210 may also be coated with a Tin (Sn) layer to improve surface fusion characteristics at the Copper, ductile iron cast metal interface; d) Preparing a mould using, e.g., a silica sand binder, a furan no-bake binder, or other chemical binder; e) Placing the flux shield 210 (e.g., a pre-formed copper insert), e.g., via an external core setting method or with a metallic mould support during the mould forming; f) Pre-heating the mould to approximately 120 degrees Celsius prior to pouring the mould. The mold (e.g., sand mold) pre-heating may be performed for one hour or longer; g) Pouring the stator flange metal (e.g., ductile iron) into the mould including the flux shield insert 210 at a temperature range of approximately 1280 degrees Celsius to approximately 1420 degrees Celsius.

Figure 4:
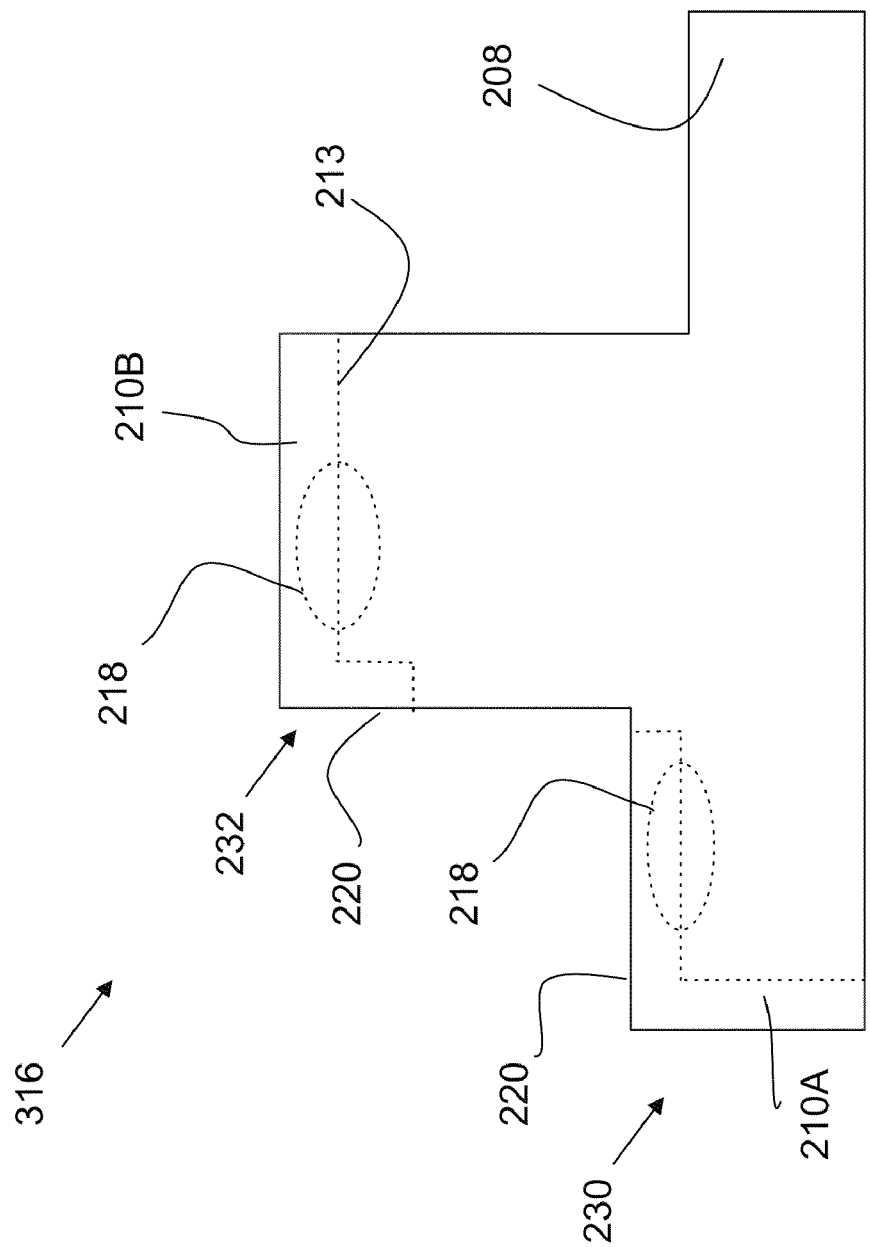
FIG. 4 shows a close-up schematic side view of an integrated stator flange assembly according to an embodiment of the invention.

Turning to FIG. 4, an integrated stator flange assembly 316 is shown according to another embodiment of the invention. In this embodiment, integrated stator flange assembly 316 may include components of integrated stator flange assembly 216, shown and described with reference to FIGS. 2-3. However, in the embodiment shown in FIG. 4, the flux shield may be formed of two (or more) distinct members. In this case, a first flux shield 210A and a second flux shield 210B, respectively, may be separate inserts placed at distinct locations in the mould to which the stator flange is cast 208. First flux shield 210A and second flux shield 210B may be formed in a substantially similar manner as flux shield 210 of FIGS. 2-3, and may be formed of substantially similar materials. However, less material (e.g., less copper) may be necessary to form integrated stator flange assembly 316 than the integrated stator flange assembly 216 of FIGS. 2-3. In this case, first flux shield 210A and second flux shield 210B may be cast to stator flange 208 at locations where the magnetic field is strongest. For example, as shown in FIG. 4, first flux shield 210A may be cast to stator flange 208 at approximately the flange edge 230 (e.g., an edge facing the stator end winding 106) and approximately the top of flange 232. These portions of stator flange 208 are two of the closest portions to stator end windings 106, and experience the strongest magnetic fields.

In one embodiment, flux shield 210 (or flux shields 210A, 210B) may be formed prior to casting of stator flange 208 (as, e.g., preformed copper inserts, described with reference to the process above), and may be inserted into the mold before the stator flange casting is poured. In this case, the final integrated stator flange assembly 216, 316 will have at least one outer surface 220 formed substantially from the preformed flux shield 210 (or flux shields 210A, 210B). As shown in FIGS. 3 and 4, at least one outer surface 220 of integrated stator flange assembly 216 may be formed substantially of a preformed copper insert (e.g., where flux shield is formed substantially of copper). In this case, integrated stator flange assembly 216, 316 may be cooled via conduction and convective heat transfer (e.g., using air or hydrogen) over its outside surface 220. This differs from the method employed in the prior art embodiment of FIG. 1, whereby convective cooling is performed in space 112 between an outer surface of stator flange 108 and an inner surface of flux shield 110.

Returning to FIG. 2, a space 214 is shown between stator end winding 106 and integrated stator flange assembly 216, 316. As shown, space 214 is larger than second space 114 of FIG. 1, due to the elimination of a separate flux shield 110 and spacing 112. This larger space 214 may reduce dielectric stresses on the stator end winding insulation. Furthermore, this space 214 may reduce the magnitude of the induced eddy currents in the flux shield 210 portion of the integrated flange assembly 216, 316 as the shield is farther away from the armature current, resulting in lower magnetic field intensity. This space may also reduce the possibility of erosion on stator end winding 106 and aid in reducing abrasion of the insulation of stator end winding more so than in the prior art. Further, as described above, space 214 may allow for greater flow of air across outer surface 220 of integrated stator flange assembly 216, 316, thereby increasing the convective cooling effect.

Integrated stator flange assembly 216, 316 may remain strong and rigid due to fusion and bonding of flux shield 210 with stator flange 208 during casting, where a separate stator flange and flux shield system would not. In this embodiment, the mechanical continuity of integrated stator flange assembly 216, 316 is distinct from the disjointed flux shield 110 and stator flange 108 of the prior art (FIG. 1). As such, integrated stator flange assembly 216, 316 is able to withstand greater forces due to its integrated nature.

As discussed herein, integrated stator flange assembly 216, 316 allows for increased strength, magnetic permeability, thermal conductivity and improved electrical resistivity. To this end, in one embodiment integrated stator flange assembly 216, 316 may include approximately 2% to 4% percent Silicon (Si), preferably approximately 3%, and approximately 0.1% to 5.0% Nickel. In an alternative embodiment, integrated stator flange assembly 216, 316 may include approximately 3.5%-4.5% Si, preferably approximately 3.9%, with a range of approximately 0.10% to 5.0% Nickel. Furthermore, in any of these embodiments, integrated stator flange assembly 216, 316 may include Carbon between approximately 3.00% and 3.75% and Manganese between approximately 0.10% and 0.25%. All of these chemical compositions may enhance the strength, magnetic permeability and electrical resistivity of integrated stator flange assembly 216, 316.

In one embodiment described above, flux shield 210 (or flux shields 210A, 210B) may include primarily preformed copper (inserted in the mold prior to casting of a ductile iron stator flange 208), where the copper insert may have a thickness of approximately 0.4 centimeters (cm) to 2.5 cm.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A dynamoelectric machine comprising:
   a rotor;
   a stator electromagnetically coupled to the rotor;
   a stator end winding coupled to the stator; and
   an integrated stator flange assembly coupled to the stator, the integrated stator flange assembly having an outer surface and including:
      a stator flange;
      a flux shield bonded directly to the stator flange, the flux shield forming a portion of the outer surface of the integrated stator flange assembly; and
      at least one fusion zone region between the flux shield and the stator flange,
      wherein the at least one fusion zone region includes a diffusion of the stator flange and the flux shield.

2. The dynamoelectric machine of claim 1, wherein the flux shield is formed of a substantially homogenous composition.

3. The dynamoelectric machine of claim 1, wherein the flux shield is cast to a top portion of the stator flange, and further comprising:
   a second flux shield bonded directly to an edge of the stator flange, the second flux shield forming a second portion of the outer surface distinct from the first portion of the outer surface.

4. The dynamoelectric machine of claim 3, wherein the flux shield and the second flux shield are formed before being cast to the stator flange.

5. The dynamoelectric machine of claim 1, wherein the flux shield is formed substantially of copper, and the stator flange is formed substantially of ductile iron.

6. The dynamoelectric machine of claim 1, wherein the flux shield and the stator flange form a unitary structure.

7. The dynamoelectric machine of claim 1, wherein the stator flange assembly is formed of approximately 2 to 4 percent Silicon and approximately 0.1 percent to 5.0 percent Nickel.

8. The dynamoelectric machine of claim 1, wherein the flux shield is formed before the stator flange.

9. The dynamoelectric machine of claim 1, wherein the stator flange assembly is formed of Carbon between approximately 3.00 percent to 3.75 percent, and Manganese between approximately 0.10 percent to 0.25 percent.

10. An integrated stator flange assembly having an outer surface and including:
    a stator flange;
    a flux shield bonded directly to the stator flange, the flux shield forming a portion of the outer surface of the integrated stator flange assembly; and
    at least one fusion zone region between the flux shield and the stator flange,
    wherein the at least one fusion zone region includes a diffusion of the stator flange and the flux shield.

11. The integrated stator flange assembly of claim 10, wherein the flux shield includes electrical grade copper and is fused directly to the stator flange.

12. The integrated stator flange assembly of claim 10, wherein the flux shield is cast to a top portion of the stator flange, and further comprising:
    a second flux shield bonded directly to an edge of the stator flange, the second flux shield forming a second portion of the outer surface distinct from the first portion of the outer surface.

13. The integrated stator flange assembly of claim 12, wherein the flux shield and the second flux shield are bonded to the stator flange by casting.

14. The integrated stator flange assembly of claim 10, wherein the flux shield is formed substantially of copper, and the stator flange is formed substantially of ductile iron.

15. The integrated stator flange assembly of claim 10, wherein the flux shield is formed before the stator flange.

16. The integrated stator flange assembly of claim 10, wherein the outer surface faces a stator end winding.

17. The integrated stator flange assembly of claim 10, wherein the stator flange is formed of approximately 2 percent to 4 percent Silicon with approximately 3.0 percent to 3.75 percent carbon, and between approximately 0.1 percent to 5.0 percent Nickel.

18. The integrated stator flange assembly of claim 10, wherein the flux shield and the stator flange form a unitary structure.

19. The integrated stator flange assembly of claim 10, wherein the stator flange is comprised of Carbon between approximately 3.00 percent to 3.5 percent and Manganese between approximately 0.10 percent to 0.25 percent.

* * * * *